United States Patent [19]

Pangos

[11] Patent Number: 4,570,972
[45] Date of Patent: Feb. 18, 1986

[54] PRESSURE CONTROL VALVING FOR PNEUMATIC LEVELING SYSTEMS

[75] Inventor: William Pangos, Centerville, Ohio

[73] Assignee: General Motors Corporation, Detroit, Mich.

[21] Appl. No.: 606,240

[22] Filed: May 2, 1984

[51] Int. Cl.⁴ .............................................. B60G 11/26
[52] U.S. Cl. ..................................... 280/714; 137/493; 137/493.2; 251/282; 280/6 R
[58] Field of Search ......................... 280/6 R, 711, 714; 251/282; 137/493, 493.2; 55/DIG. 17; 180/41

[56] References Cited

U.S. PATENT DOCUMENTS

| | | | |
|---|---|---|---|
| 3,042,392 | 7/1962 | Schmitz et al. | 267/31 |
| 3,613,718 | 10/1971 | Ballinger | 134/493 |
| 3,911,988 | 10/1975 | Richards | 152/427 |
| 4,009,896 | 3/1977 | Brewer | 285/305 |
| 4,010,721 | 3/1977 | Ludwig | 137/493.2 |
| 4,040,404 | 8/1977 | Tagawa | 137/493.2 |
| 4,105,216 | 8/1978 | Graham et al. | 280/6 R |
| 4,167,952 | 9/1979 | Reinicke | 137/493 |
| 4,317,467 | 3/1982 | Heyland | 137/493 |
| 4,377,299 | 3/1983 | Fujii | 280/714 |
| 4,504,081 | 3/1985 | Shimizu et al. | 280/714 |

Primary Examiner—Joseph F. Peters, Jr.
Assistant Examiner—Kenneth R. Rice
Attorney, Agent, or Firm—Charles R. White

[57] ABSTRACT

A pneumatic leveling system for vehicles in which a pressure balancing valve assembly is incorporated within the cover assembly of the system air dryer. The pressure balancing valve assembly is operative to limit the pressure in the pneumatic suspension units while allowing effective pump up and restriction release for desiccant regeneration in accordance with changes in vehicle loads.

6 Claims, 3 Drawing Figures

PRESSURE CONTROL VALVING FOR PNEUMATIC LEVELING SYSTEMS

This invention relates to vehicle leveling and more particularly to a new and improved pressure balancing valve assembly for a pneumatic vehicle leveling system operatively interposed between a pneumatically adjustable leveling unit and a pneumatic pressure source.

Prior to the present invention, various automatic leveling systems for vehicles have incorporated air adjustable shock absorbers in parallel with rear suspension springs to adjust the rear height of the vehicle body with changes in vehicle loading. In addition to the air adjustable shock absorbers, such leveling systems generally include a compressor assembly, an air dryer, a height sensor and exhaust valving to control the pressures within the system for vehicle leveling purposes. In some systems, pressure limiter valves are connected with special fittings in the pressure line between the compressor and air adjustable shock absorbers to limit pressure in the elastomer air sleeves of the shock absorbers and to assure optimized ride and handling qualities. Such valves restrict the relatively high pressure supplied to the rear air adjustable shocks to a predetermined maximum limit to provide protection for the air sleeves and the pneumatic system.

The present invention provides a new and improved leveling system for vehicles and incorporates a pressure balancing valve assembly disposed internally within the air dryer assembly for controlling and balancing the pressure between the air adjustable suspension units and the compressor.

In the preferred embodiment of the present invention, the pressure balancing valve assembly is integrated directly into the cover assembly of the air dryer to provide for new and improved control and balancing of leveling system pressures which eliminates the need for a separate pressure limiter valve and its two external fittings in the pressure line of the system. This invention incorporates minimum and maximum pressure control valves within a removable cover assembly of a leveling system air dryer. In this invention, installation, inspection and repair or replacement of pressure control valving in the system is optimized.

It is a feature, object and advantage of the present invention to provide a new and improved pressure balance valve assembly within a leveling system for balancing and controlling pressure between pneumatic vehicle suspension units and the air compressor of the system.

It is another feature, object and advantage of this invention to provide a new and improved minimum and maximum pressure control valves incorporated directly in the air dryer unit between a pneumatic compressor and pneumatic vehicle suspension units to limit suspension unit pressures to predetermined minimum and maximum pressures and to assure optimum ride and handling characteristics.

It is another feature, object and advantage of this invention which provides a new and improved integral air dryer and pressure balancing valve assembly for automatic leveling systems in which the pressure limiter has straight-forward valving that is installed within the air dryer cover assembly which is readily accessible for installation, inspection and repair.

These and other features, objects and advantages of the invention will be more apparent from the following detailed description and drawing in which.

Figure 1:
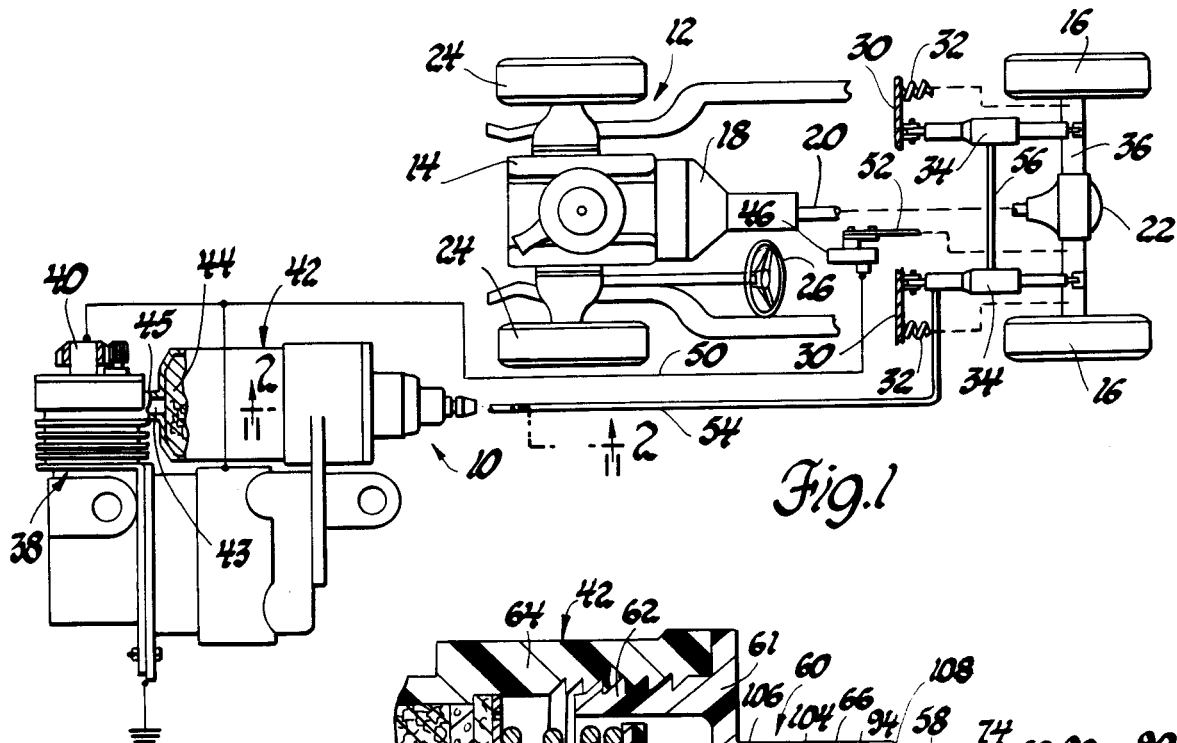
FIG. 1 is a schematic diagram of a vehicle leveling system.

Turning now in greater detail to the drawing, FIG. 1 diagrammatically illustrates a leveling system 10 for a vehicle 12 in which internal combustion engine 14 drives the rear wheels 16 of the vehicle through a change speed transmission 18, propeller shaft 20 and differential 22. Front wheels 24 of the vehicle are steered by a vehicle operator through a handwheel 26 operatively connected thereto by conventional steering shafts, steering gear and steering linkages, now shown.

The vehicle includes a unitized body 30 conventionally supported at the rear by suspension springs 32 and by pneumatically interconnected air adjustable shock absorber units 34 which have their lower ends connected to rear axle housing 36. The shock absorber units may correspond to the units disclosed in U.S. Pat. No. 3,042,392 issued July 3, 1962 to W. F. Schmitz et al entitled Combination Shock Absorber and Air Spring, assigned to the assignee of this invention and hereby incorporated by reference.

In addition to the air adjustable shock absorbers 14, the leveling system 10 has an electrically driven air compressor assembly 38 with intake and exhaust valves, not illustrated, plus a solenoid operated exhaust valve 40 that releases air from the system when energized. Furthermore, the leveling system 10 includes a generally cylindrical air dryer 42 that is pneumatically attached to the compressor output by an air passage 43 through neck 45 and contains a desiccant 44 such as silica gel that absorbs moisture from the air before it is delivered to the air adjustable shocks 34 and returns the moisture to the atmosphere when the system is being exhausted.

Vehicle leveling is controlled by a height sensor 46 mounted to the vehicle body and electrically connected to the compressor motor and exhaust valve solenoid by conductors within wiring harness 50. The sensor 46 has a swingable actuator arm 52 operatively attached to the rear wheel axle. When sufficient load is added to the vehicle body, the vehicle body is displaced downwardly causing the actuator arm to rotate in one direction from an initial position. When height control is reached, the compressor electrical circuit is completed and the compressor runs to supply pressure air to the adjustable shock absorber units 34 through the air dryer 42 and pressure tubings 54 attaching the output of the air dryer to the left side shock absorber 34. The pneumatic chambers of two air adjustable shock absorbers are interconnected by pneumatic tubing 56 so that they are pressurized or are deflated together. As the air shocks inflate, the vehicle body moves upward rotating the height sensor back toward its original position prior to the load addition. Once the vehicle body reaches its range of level height, the sensor opens the compressor relay circuit to shut off the compressor to terminate upward adjustment.

When an excess load is removed from the rear of the vehicle, the body is forced upwardly by springs 32 causing the height sensor actuating arm to rotate in an opposite direction. After an initial delay of a few seconds by an activated internal timing circuit, not illustrated, the height sensor completes the exhaust solenoid circuit. The exhaust valve then opens and starts exhausting air from the air adjustable shocks back through the air dryer and exhaust valve into the atmosphere. As the body of the vehicle lowers the height sensor actuating arm is rotated toward its original position. When the vehicle body reaches its original range of level heights, the sensor opens the exhaust solenoid circuit which closes the exhaust valve 40 to stop further air from escaping.

Figure 2:
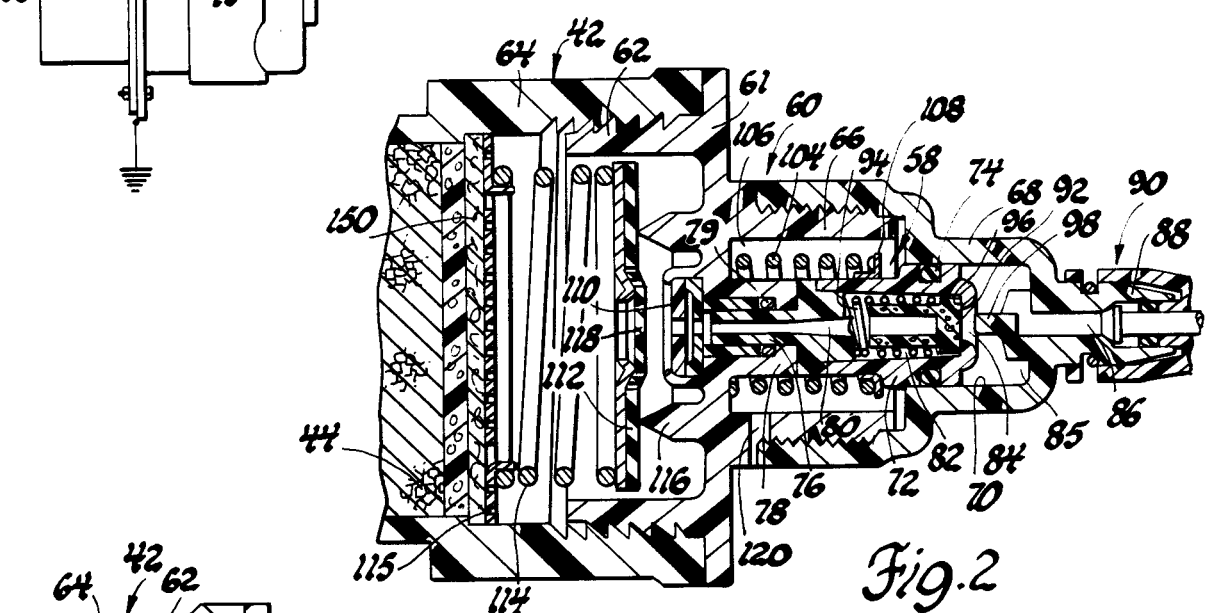
FIG. 2 is a sectional view of a pressure balancing valve and is a view taken generally along lines 2—2 of the air dryer of the leveling system of FIG. 1.
Figure 3:
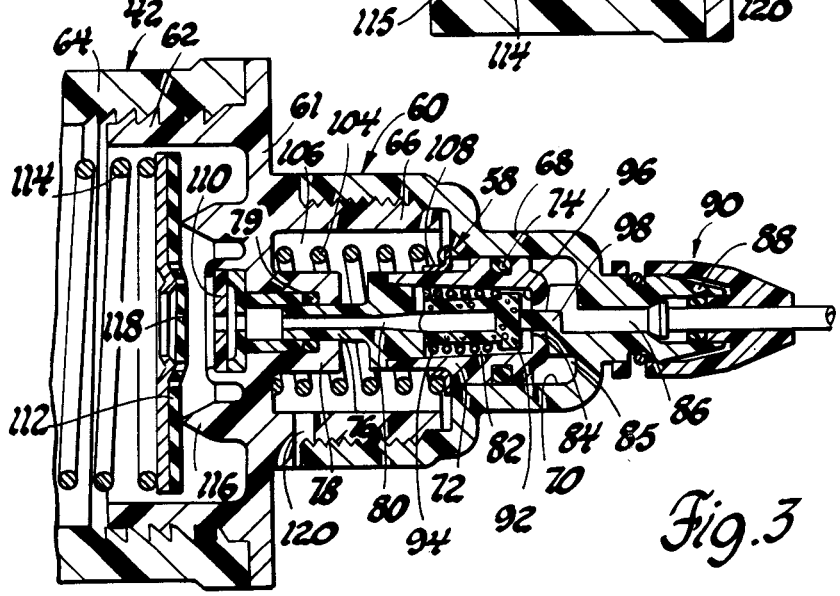
FIG. 3 is a view similar to that of FIG. 2 showing the pressure balancing valve in one condition of operation.

This invention features a new and improved pressure balancing valve assembly 58 operatively mounted with a cover assembly 60 of the air dryer 42 to control and limit pressure within the air adjustable shock absorbers. As best shown in FIGS. 2 and 3, the cover assembly 60 includes a main closure body 61 that has a large diameter inwardly extending neck 62 which is threadedly connected into the forward end 64 of the air dryer. The body of the cover assembly 60 also has an outwardly extending, reduced diameter, externally threaded neck 66 which receives an internally threaded end cap 68.

The end cap 68 of the cover assembly has a reduced diameter inner cylindrical wall portion 70 within which a pressure balancing piston 72 is mounted for linear sliding movement. An O-ring 74 carried by the piston 72 has sliding pneumatic sealing engagement with the inner wall portion 70 of the end cap 68. Piston 72 further has a stem 76 which extends axially through a cylindrical guide 78 formed on the closure body inwardly and concentrically located with respect to threaded neck 66. Annular air blocking seals 79 are installed between stem 79 and an inner wall of guide 78. Stem 76 has an axial air passage 80 therethrough which pneumatically connects the interior of the air dryer 42 with an inner chamber 82 formed within the piston 72. This inner chamber 82 has communication with the pneumatic line 54 via an orifice 84 in the outboard end of piston 72, a variable volume pressure chamber 85 formed in end cap 68 forward of between the piston 72, and through a passage 86 formed in the end terminal 88 of the cover assembly. The end terminal 88 is part of a quick connect coupling 90. The details of such couplings are disclosed in U.S. Pat. No. 4,009,896 issued Mar. 1, 1977 to R. M. Brewer for Quick Connect Coupling assigned to the assignee of this invention and hereby incorporated by reference.

Airflow through orifice 84 is controlled by an internal valve element 92 trapped in inner chamber 82 and biased by spring 94 into engagement with internal valve seat 96 to block orifice 84. The valve element can be physically contacted and displaced from its seat 96 by pin 98 axially spaced from the valve element and fixed within the end cap. Pin 98 is in axial alignment with orifice 84 and can project through the orifice to engage and displace the valve element under certain unbalanced pressure conditions. This displacement results from linear movement of the piston toward the pin by action of coil spring 104 mounted in a spring pocket 106 that acts against a flanged spring seat 108 fixed to the shank of piston 72.

The air dryer cover assembly includes a restrictor valve assembly 110 secured to the inner wall of the closure body of the cover assembly which is in series with the air passage 80 so that exhaust air flow from the shock absorbers is allowed to expand to nearly atmospheric pressure as it enters the desiccant chamber from the air adjustable shock absorbers for improved moisture removal. The cover assembly 60 also contains a minimum pressure retention valve element 112 biased by spring 114 seated on retainer 115 into engagement with valve seat 116 to retain at least minimum pressure in the suspension units at all times to prevent air pressure in the leveling units from being reduced to a level that allows the elastomeric sleeve of the air sprin to collapse on itself and add friction to the suspension. The minimum pressure retention valve includes one-way valving 118 to allow the compressor to supply pressure to the pressure line 54 when such is required by position of the height control valve. Element 150 is a filter to prevent intrusion of the desiccant into the pressure balance valving housed within the air dryer cover assembly of this invention.

FIG. 2 shows the valving 58 in pressure balanced condition with pneumatic pressure in the air adjustable shock absorbers urging pistion 72 to the left in FIG. 2 against the force of spring 104. The spring force is preselected so that a predetermined pressure is maintained in the air adjustable shock absorbers for pneumatic suspension purposes. In one preferred embodiment, the spring is selected to provide pressure balancing at 100 psi. In the event of a pressure drop in the air adjustable shock absorbers spring 104 shifts the piston to the FIG. 3 position in which pin 98 unseats valve element 92 to clear the pneumatic passage through the cover assembly so that the compressor can supply pressure air to the air adjustable shocks until the pressure balanced condition is obtained producing improved protection of the shock absorber air sleeves as well as other components of the pneumatic system. Vent 120 in the closure body connects into the spring pocket to exhaust leakage air therefrom.

While the invention has been described in connection with air adjustable shock absorbers, the unit can be used with air springs or other air suspension units to replace the suspension springs 32 and the air adjustable shock absorbers.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. Pressure balancing valve assembly for a vehicle pneumatic leveling system comprising a compressor for supplying pressurized air to an air adjustable suspension unit operatively mounted between sprung and unsprung masses of a vehicle, an air dryer unit operatively interposed in a pneumatic connection between said compressor and said suspension unit, said air dryer unit comprising a housing with a dessicant therein for drying air flowing therethrough from said compressor to said suspension unit, a cover assembly for said air dryer unit formed with an air flow passage therethrough, a valve assembly operatively mounted in said air passage of said cover assembly, said valve assembly comprising piston means shiftably mounted in said air passage and valve element means mounted in said piston means and shiftable between a first and balanced position in which pressure in said suspension unit is a predetermined high pressure and there is no flow of air through said passage and a second position in which pressure in said suspension unit is less than said predetermined high pressure and pressurized air can flow through said passage to said suspension unit, and spring means in said housing for moving said valve element means from said first to said second position in response to the drop in pressure in said suspension unit or by the supply of a pressure beyond a predetermined pressure by said compressor for effecting the unseating of said piston means and the exhaust of air from said system until a predetermined balance is obtained.

2. Pressure balancing valve assembly for a wheeled vehicle pneumatic leveling system comprising a compressor for supplying pressurized air to an air adjustable suspension unit operatively mounted between sprung and unsprung masses of a vehicle, a pressure control unit operatively interposed in a pneumatic connection between said compressor and said suspension unit, said pressure control unit comprising an air dryer housing formed with an air flow passage therethrough, a valve assembly operatively mounted in said air passage, said valve assembly comprising piston means shiftably mounted in said air passage and valve element means shiftably mounted internally of said piston means between a first position in which the flow of air through said passage is blocked and a second position in which air can flow through said passage, and pin means in said housing for moving said valve element means from said first to said second position in response to the reduction of a pressure in said suspension unit beyond a predetermined pressure for effecting the movement of said piston means and the unseating of said valve element means so that the compressor can supply air to said system until a predetermined balance is obtained.

3. A pressure balancing valve assembly for an air leveling system comprising an air dryer with an air inlet passage adapted to be connected to a source of air pressure, a desiccant contained within said housing, a removable cover assembly closing one end of said housing having an air outlet passage adapted to be pneumatically connected to air adjustable vehicle leveling units, an air outlet passage through said cover assembly leading from the interior of said housing into said air outlet passage, a piston mounted for shifting movement within said cover assembly and havin an intermediate air passage therethrough which pneumatically connects the interior of said air dryer with said air outlet passage, said piston having a restriction therein for controlling the flow through said intermediate air passage, a valve element mounted in said intermediate air passage for movement between a first position in which said intermediate air passage is blocked and a second position in which said restriction and intermediate air passage are cleared and spring means in said housing for shifting said piston means to supseqently effect movement of said valve means from said restriction in response to the reduction of pressure in a connected air suspension below a predetermined pressure to effect the displacement of said valve element from said restriction to clear said intermediate passage so that pressurized air can be supplied to said suspension units.

4. The pressure balancing valve assembly of claim 3 in which said valve element is operatively mounted within said piston for movement between said first and second positions.

5. The pressure balancing valve assembly of claim 4 and further incorporating pin means carried by said cap to unseat said valve element in response to movement of said piston means by said spring.

6. An air dryer assembly for a pneumatic vehicle suspension system comprising a shell-like housing forming a chamber for a desiccant, first air passage means leading into said chamber from the exterior thereof allowing pressurized air to be supplied thereto, a cover assembly for said housing, second air passage means in said cover assembly leading from said chamber to the exterior thereof for connection with an air adjustable suspension unit, first valve means within said housing for maintaining a minimum pressure in the air suspension unit and second valve means incorporating a piston and a valve element within said piston controlling air flow within said second air passage means for limiting the pressure supplied to said air adjustable unit to a predetermined maximum pressure.

* * * * *